United States Patent
Horsley et al.

(10) Patent No.: US 6,556,584 B1
(45) Date of Patent: Apr. 29, 2003

(54) SYSTEM AND METHOD OF COMMUNICATING NON-STANDARDIZED ADDRESSES OVER A STANDARDIZED CARRIER NETWORK

(75) Inventors: Douglas C. Horsley, Scottsdale, AZ (US); Kanchei Loa, Austin, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/055,455

(22) Filed: Apr. 6, 1998

(51) Int. Cl.[7] .............................. H04J 3/22; H04J 3/24
(52) U.S. Cl. ...................................... 370/465; 370/474
(58) Field of Search .................... 370/389, 401, 370/445, 465, 466–467, 392, 396, 470–471, 474–475, 476, 503, 509, 512; 709/220, 227, 228, 230, 237

(56) References Cited

U.S. PATENT DOCUMENTS

| | | | | |
|---|---|---|---|---|
| 5,150,464 A | * | 9/1992 | Sidhu et al. | 395/200 |
| 5,282,270 A | * | 1/1994 | Oppenheimer et al. | 395/200 |
| 5,388,213 A | * | 2/1995 | Oppenheimer et al. | 395/200 |
| 5,423,002 A | * | 6/1995 | Hart | 395/200 |
| 5,425,028 A | * | 6/1995 | Britton et al. | 370/94.1 |
| 5,594,732 A | * | 1/1997 | Bell et al. | 370/401 |
| 5,623,605 A | * | 4/1997 | Keshav et al. | 395/200.17 |
| 5,633,869 A | * | 5/1997 | Burnett et al. | 370/396 |
| 5,659,684 A | * | 8/1997 | Giovannoni et al. | 395/200.8 |
| 5,896,382 A | * | 4/1999 | Davis et al. | 370/401 |
| 5,905,908 A | * | 5/1999 | Wagner | 395/831 |
| 5,920,698 A | * | 7/1999 | Ben-Michael et al. | 395/200.54 |
| 5,940,394 A | * | 8/1999 | Killian | 370/393 |
| 6,041,042 A | * | 3/2000 | Bussiere | 370/245 |

* cited by examiner

*Primary Examiner*—Alpus H. Hsu
*Assistant Examiner*—Toan Nguyen

(57) ABSTRACT

A non-standardized private computer network (20) uses a tunnel engine (50, 58) to allow a computer (12–16) on one private computer network with non-standard address to communicate over a standardized carrier network (32) with a computer (22–26) on the same private computer network. The tunnel engine includes a local router (52) and rule check engine (54) in the private computer network and a remote router (56) in the standardized carrier network. The rule check engine performs rule checks to determine proper encapsulation and routing of the message. The message is encapsulated with a standardized address of endpoints of a tunnel through the carrier network corresponding to the desired destination. With a standardized address, the encapsulated message packet passes through the tunnel and arrives at the boundary of the destination private computer system. The encapsulation is removed and the message is routed to the destination computer.

18 Claims, 1 Drawing Sheet

SYSTEM AND METHOD OF COMMUNICATING NON-STANDARDIZED ADDRESSES OVER A STANDARDIZED CARRIER NETWORK

BACKGROUND OF THE INVENTION

1. Field of the Invention

The present invention relates in general to computer networks and, more particularly, to a method of communicating non-standardized addresses over a standardized carrier network.

2. Description of the Related Art

Computer systems are commonly linked together through a communication network. The communication network can be local, for example, a token ring or ethernet link between a number of computers in one or more sites. Each computer is connected, for example by coax cable, to a central server through which the computers exchange and share information. The communication link can also be global over common carrier lines or other communication networks. The public internet is the classic example of a global communication link.

The development of modern computer communications has not had the stabilizing influence of a strong governing body. As a consequence, large corporations and other entities, partly out of lack of standards and partly out of necessity, have developed their own dedicated and private computer networks each with their own addressing scheme. At the same time, the internet and other communication networks have standardized to their own addressing scheme (s). As computer communications developed such private computer networks have become incompatible with the global internet. Private computer systems have generally avoided the global internet incompatibility issue by using dedicated leased lines between remote locations.

The typical system for a private computer network comprises one or more computers at a first location connected by local area network to one or more routers. The router is a dedicated computer or processor, which handles incoming and outgoing communications to the local network. The router is connected, possibly through additional routers, to a leased communication line which in turn connects to a destination router in a second remote location. The router operates as a switch to route data from a source computer to a destination computer based on an address. The router includes a table lookup to determine the next location or "hop" in the path to the remote destination. The leased line can be a hardwired telephone line, fiber optic cable, satellite link, or other wireless link.

Such dedicated leased lines are rather expensive resources for private communication networks. To reduce operating costs, it is desirable to find a less expensive alternative for global communication links. One option is to communicate between routers over public or private standardized carrier networks, such as the internet. In the above example, the local router at the first location interfaces through an internet service provider to the internet. A pathway or "tunnel" is established through the carrier network to an endpoint at the second location. The local router at the second location, also interfaced with an internet service provider, communicates with the local router at the first location through the tunnel.

The difficulty with such a plan is that the addressing scheme on the private computer network often does not match the addressing scheme on the public internet or other standardized carrier network. The private computer network may have been setup with a custom addressing scheme that has little or no relationship to the standardized carrier network address scheme, or may otherwise have some address conflict with the standardized carrier network. The address conflict often takes the form of duplicate addresses between the standardized carrier network and the private computer network. Thus, a potential for address conflicts exists between the non-standardized private computer network and the standardized public carrier network.

DETAILED DESCRIPTION OF THE PREFERRED EMBODIMENT

Figure 1:
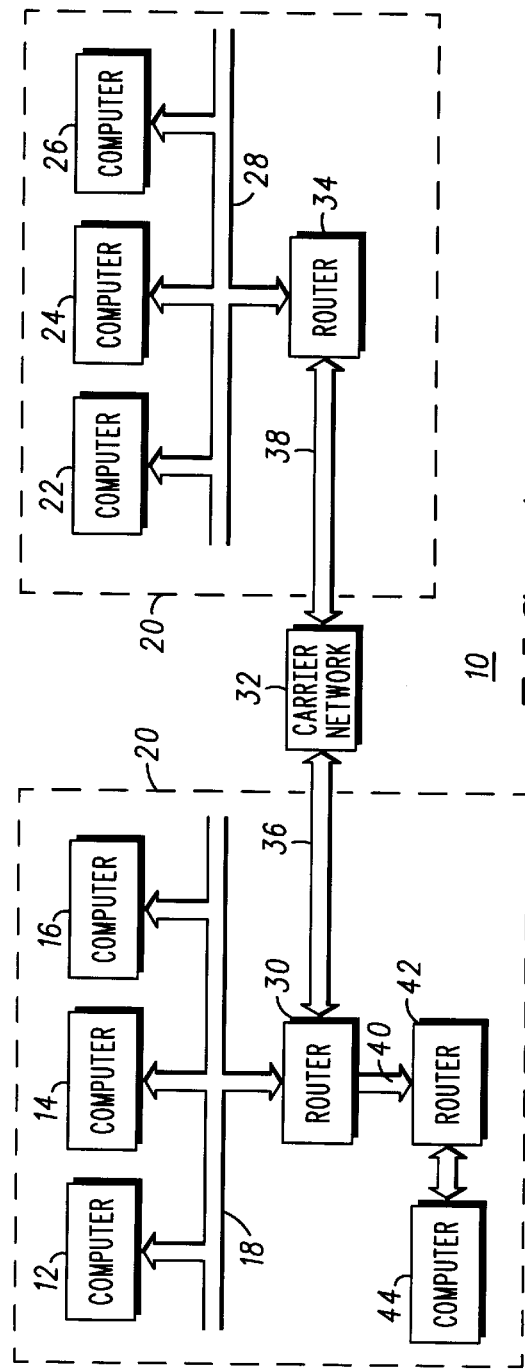
FIG. 1 is a block diagram illustrating a computer network.

Referring to FIG. 1, a communication network 10 is shown including computers or work stations 12, 14, and 16 coupled to local area communication network 18. Computers 12–16 communicate locally with one another via local area network 18. Communication network 10 also includes computers or work stations 22, 24, and 26 coupled to local area communication network 28. Computers 22–26 communicate locally with one another via local area network 28. Local area networks 18 and 28 may be a token ring, ethernet, wireless, or other dedicated link. Local area networks 18 and 28 and computers 12–16 and 22–26 are part of a private computer network 20, such as held by a major corporation or other entity. Alternately, computers 12–16 are part of one private computer network and computers 22–26 are part of another private computer network.

If a computer on local area network 18 needs to communicate with a computer on local area network 28, the data is routed through router 30, carrier network 32, and router 34. For example, in order for computer 12 to send a message M1 containing data or other information to computer 22, the message M1 is first enclosed in a packet and then sent to router 30 over local area network 18. The packet includes the message M1 along with the source address of computer 12 and the destination address of computer 22. Router 30 may in practice comprise a number of routers or linking computer systems depending on the complexity of the communication network. Router 30 includes a router table that contains address(es) of destination system(s) or at least an intermediate link ("hop") to the next router leading to the desired destination. An entry in the router table shows the next hop or next node or next router in the path to the destination system. Router 30 ships the message packet M1 via carrier network 32 to router 34. Carrier network 32 is a public or private standardized carrier network, for example, the global internet. Router 34 forwards the message packet over local area network 28 to computer 22, which in turn extracts message M1 for the end user.

The pathway over carrier network 32 often includes a number of internal routers, linking computer systems, and transmission mediums such as hardwired telephone lines, fiber optic cables, coax cables, microwave, RF, satellite, and other wireless links. To simplify the communication process over carrier network 32, the network authority has established tunnels through carrier network 32. A tunnel is a communication link or pathway between one endpoint (entry point) of carrier network 32 and another endpoint (exit point) of carrier network 32. If the endpoints (entry and exit) are known, then the details of the routing through carrier network 32 become transparent. For example, one endpoint of carrier network 32 is link 36, which is coupled to router 30, and another endpoint of carrier network 32 is link 38, which is coupled to router 34. With the endpoints defined, a tunnel T1 is established through carrier network 32 to allow router 30 to communicate with router 34, or visa versa.

Router 30 also processes addresses of other routers or computers in the private computer network 20. For example, router 30 communicates by way of link 40 with router 42, which in turn according to its routing table passes a message to computer 44, all within private computer network 20.

The addressing scheme of private network 20 is not necessarily compatible with the addressing scheme of the standardized carrier network 32. That is, the address leading to computer 22 by way of carrier network 32 may conflict with the address leading to computer 44 by way of router 42. The conflict occurs because the addressing scheme on private computer network 20 has no knowledge of and no relationship with the addressing scheme for carrier network 32. The addressing schemes were developed independent of one another, hence, the potential exits for a conflict where the same address is assigned to two different destination computer systems.

Figure 2:
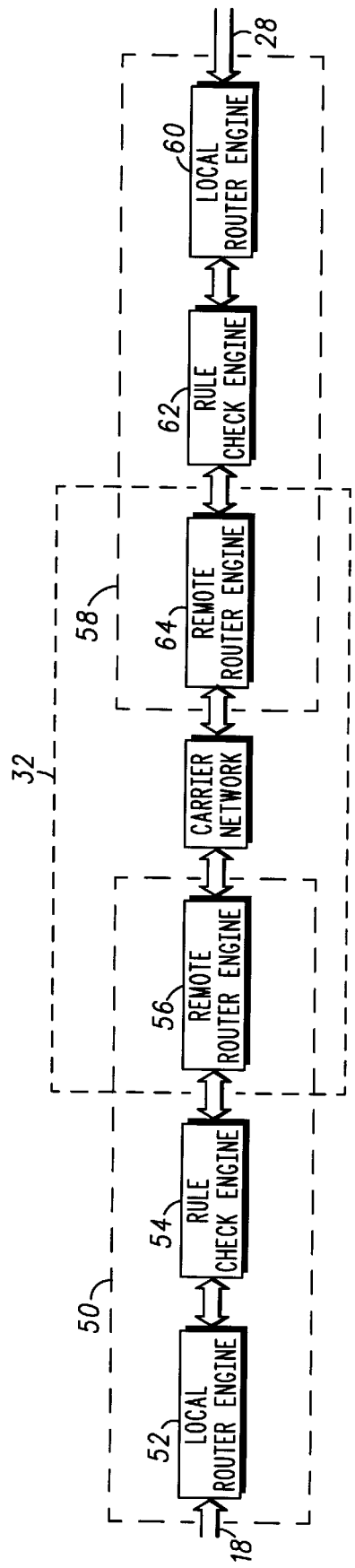
FIG. 2 is a block diagram illustrating the tunnel engines.

As part of the present invention, a tunnel engine 50 is provided in private computer system 20 as shown FIG. 2. Tunnel engine 50 comprises local router engine 52, rule check engine 54, and remote router engine 56. Local router engine 52 contains a routing table of forwarding addresses for private computer system 20. For example, the routing table in local router engine 52 may indicate that rule check engine 54 is the next hop in the communication path. Alternatively, the routing table may indicate that router 42 is the next hop in the communication path. Remote router engine 56 contains a routing table of forwarding addresses for carrier network 32. On the other side of carrier network 32, a tunnel engine 58 is provided in private computer system 20 also comprising similar local router engine 60, rule check engine 62, and remote router engine 64. Local router engine 60 contains a routing table of forwarding addresses for private computer system 20. Remote router engine 64 contains a routing table of forwarding addresses for carrier network 32. The term "engine" refers to a computing system or processor to perform a designated task with a computer program or other software.

The router tables are implemented in a memory device, such as RAM, ROM, disk drive, CD-ROM, etc., operating with a computer system and associated software. The rule checkers are implemented in a computer program or software operating on a computer system that interfaces with the router tables. The router tables and rule check may be on the same computer system or separate computer systems. Thus, the tunnel engine is a computing system that resides on the boundary between the private computer network 20 and carrier network 32, i.e. at the tunnel endpoints, and resolves any potential address conflicts.

In one embodiment, local router engine 52 and rule check engine 54 are physically or logically located within router 30, or other portion of private network 20. Local router engine 52 contains in its router table the next hop in private network 20, e.g. either router 42 or rule check engine 54. Remote router engine 56 is physically or logically located in carrier network 32 in that remote router engine 56 contains in its router table the next hop within carrier network 32. Likewise, local router engine 60 and rule check engine 62 are physically or logically located within router 34, or other portion of private network 20, while remote router engine 64 is located in carrier network 32. In an alternate embodiment, the local router engines, rule check engines, and remote router engines may be located in an interface between the private computer network and carrier network, provided the local router engines have in their router tables the next hop in the private network and the remote router engines have in their router tables the next hop in the carrier network.

The tunnel engines operate as follows. Again, assume computer 12 (source) generates a message packet M1 along with the source and destination address for computer 22 (destination) and passes it to router 30. The source address of computer 12 and destination address of computer 22 are formatted according to private computer network 20, which is assumed to be non-standardized with respect to carrier network 32. The local router engine 52, within router 30, receives the message packet M1 from local area network 18. Local router engine 52 looks up the non-standardized destination address in its router table and determines whether or not the path to computer 22 includes carrier network 32. In the present example, the path to computer 22 does indeed include carrier network 32. The next hop for a destination of computer 22 is rule check engine 54. If the destination address had been computer 44, then the path would not include carrier network 32 and the message packet M1 would have been sent to router 42.

The rule check engine 54 performs a rule check on the message packet M1. The rule check states that if the message packet has been received from local router engine 52, then encapsulate the message packet M1, with its non-standardized private computer network addresses, into an encapsulated message packet with standardized or legal source and destination addresses that comply with or are compatible with the addressing scheme of carrier network 32. The rule check is performed before entry of the message packet into carrier network 32. The standardized source and destination addresses define the endpoints of the tunnel T1 through carrier network 32. For example, there is a standardized address for one endpoint of the tunnel through carrier network 32, which corresponds to router 30 or link 36. There is another standardized destination address for router 34, or link 38, as the other endpoint of the tunnel leading to computer 22. The legal and standardized source and destination addresses, corresponding to or translated from the non-standardized private computer network addresses, are locally stored in rule check engine 54 and may be pre-configured or dynamically built as messages are sent back and forth across carrier network 32.

The encapsulated message packet has standardized legal source and destination addresses corresponding to the endpoints of the tunnel leading across or through carrier network 32 to computer 22. As part of the rule check procedure, rule check engine 54 forwards the encapsulated message packet to remote router engine 56 if the standardized source address is equal to the tunnel endpoint corresponding to link 36. Remote router engine 56 looks up the address of the endpoint of the tunnel in its router table and determines the next hop, i.e. next node, linking computer, or router, in carrier network 32. The next hop may be another router (not shown) within carrier network 32, or it may be the actual endpoint of the tunnel, i.e. link 38 or router 34. Each internal router in carrier network 32 forwards the encapsulated message packet according to its standardized address along to the next hop in the tunnel. The encapsulated message packet passes through the tunnel and ultimately arrives at the endpoint of the tunnel. Remote router engine 64 looks up the standardized destination address in its router table and forwards the encapsulated message packet to rule check engine 62.

The rule check engine 62 performs a rule check on the encapsulated message packet. The rule check states that if the encapsulated message packet has been received from remote router engine 64, then remove the encapsulation by extracting or retrieving the original message packet M1 with its non-standardized private computer network source and destination addresses. The standardized source address is not equal to the local tunnel end point, therefore, rule check engine 62 forwards the message packet M1 to local router engine 60, which looks up the non-standardized destination address for computer 22. Router 34 passes the message packet to computer 22 over local area network 28, which in turn extracts message M1 for the end user.

The user of computer 22 reads the message M1 decides to respond with message M2. Computer 22 (source) generates a message packet M2 along with the source and destination addresses for computer 12 (destination) and passes it to router 34. Again, the source address of computer 22 and destination address of computer 12 are formatted according to private computer network 20, which may or may not be standardized with carrier network 32. The local router engine 60, within router 34, receives the message packet M2 from local area network 28. Local router engine 60 looks up the non-standardized destination address in its router table and determines that the next hop for a destination of computer 12 is rule check engine 62.

The rule check engine 62 performs a rule check on the message packet M2. According to the rule check, if the message packet has been received from local router engine 62, then encapsulate the message packet M2, with its non-standardized private computer network addresses, in an encapsulated message packet with standardized or legal source and destination addresses that comply with carrier network 32. The standardized source and destination addresses define the endpoints of a tunnel through carrier network 32, i.e. links 36 and 38, which leads to computer 12. The legal and standardized source and destination addresses, corresponding to or translated from the non-standardized private computer network addresses, are locally stored in rule check engine 62 and may be pre-configured or dynamically built as messages are sent back and forth across carrier network 32.

The encapsulated message packet has standardized legal source and destination addresses corresponding to the endpoints of the tunnel leading across or through carrier network 32 to computer 12. As part of the rule check procedure, rule check engine 62 forwards the encapsulated message packet to remote router engine 64 if the standardized source address is equal to the tunnel endpoint corresponding to link 38. Remote router engine 64 looks up the address of the endpoint of the tunnel in its router table and determines the next hop in carrier network 32. The next hop may be another router within carrier network 32, or its may be the actual endpoint of the tunnel, i.e. link 36 or router 30. Each internal router in carrier network 32 forwards the encapsulated message packet along to the next hop in the tunnel. The encapsulated message packet passes through the tunnel and ultimately arrives at the endpoint of the tunnel. Remote router engine 56 looks up the destination address in its router table and forwards the encapsulated message packet to rule check engine 54.

The rule check engine 54 performs a rule check on the encapsulated message packet. The rule check states that if the encapsulated message packet has been received from remote router engine 56, then remove the encapsulation and extract the original message packet M2 with its non-standardized private computer network source and destination addresses. The standardized source address is not equal to the local tunnel end point, therefore, rule check engine 54 forwards the message packet M2 to local router engine 52, which looks up the non-standardized destination address for computer 12. Router 30 passes the message packet M2 to computer 12 over local area network 18, which in turn extracts the message for the user.

In summary, the present invention provides a tunnel engine that allow a computer on one private computer network with non-standardized addresses to communicate over a standardized carrier network with a computer on the same private computer network or another private computer network also with non-standardized addresses. The tunnel engine receives messages or information from the private computer network with associated non-standard addresses. The tunnel engine includes a local router and rule check engine in the private computer network and a remote router in the standardized carrier network. The rule check engine performs rule checks to determine proper encapsulation and routing of the message.

If the message is destined to be routed across the standardized carrier network, then the message is encapsulated in another packet having standardized addresses of endpoints of a tunnel through the carrier network corresponding to the desired destination. With standardized addresses, the encapsulated message packet passes through the tunnel and arrives at the boundary of the destination private computer system. The encapsulation is removed and the message is routed to the destination computer. By using an intermediate carrier network, the private computer system need not maintain their own private leased lines. The private computer networks are allowed to keep their non-standardized addressing schemes and still communicate over a standardized carrier network by encapsulating the non-standardized address with a standardized address.

What is claimed is:

1. A computer implemented method of communication between first and second computer systems having a non-standardized addressing scheme through a carrier network, comprising the steps of:

generating a data packet from the first computer system to be sent to the second computer system, where the data packet includes non-standardized source and destination addresses; and performing a rule check using a rule check engine on the data packet to determine that the data packet has been received from a local router engine, and to encapsulate the data packet in an encapsulated data packet having standardized source and destination addresses compatible with the carrier network and forward the encapsulated data packet through a tunnel of the carrier network if the standardized source address is equal to an entry endpoint of the tunnel.

2. The method of claim 1 further including the steps:

extracting the data packet from the encapsulated data packet; and forwarding the data packet to the second computer system according to the non-standardized destination address.

3. The method of claim 2 further including the step of passing the data packet to a first local router engine to determine if a pathway to the second computer system includes the carrier network.

4. The method of claim 3 further including the step of passing the data packet to a first rule check engine to encapsulate the data packet with the standardized destination address if the data packet is received from the first local router engine.

5. The method of claim 4 further including the step of passing the encapsulated data packet to a first remote router engine to determine a first hop through the tunnel of the carrier network leading to the second computer system if the standardized source address is equal to a local tunnel endpoint.

6. The method of claim 5 further including the steps of:

passing the encapsulated data packet to a second remote router engine;

looking up a route to a second rule check engine; and passing the encapsulated data packet to the second rule check engine.

7. The method of claim 6 further including the steps of:

extracting the data packet with the non-standardized destination address if the data packet is received from the second remote router engine; and passing the data packet to the second local router engine if the standardized source address is not equal to a local tunnel endpoint.

8. A computer implemented method of communicating between first and second computer systems, comprising the steps of:

generating a data packet from the first computer system to be sent to the second computer system, where the data packet includes a first source and destination addresses compatible with the second computer system;

performing a rule check on the data packet using a rule check engine to determine that the data packet has been received from a local router engine, and to encapsulate the data packet in an encapsulated data packet having second source and destination addresses compatible with the carrier network and forward the encapsulated data packet through a tunnel of the carrier network if the second source address is equal to an entry endpoint of the tunnel;

performing a rule check on an encapsulated data packet, and if the encapsulated data packet has been received from the carrier network to remove the encapsulation; and forwarding the unencapsulated data packet to the first computer system.

9. The method of claim 8 further including the step of passing the data packet to a first local router engine to determine if a pathway to the second computer system includes the carrier network.

10. The method of claim 9 further including the step of passing the data packet to a first rule check engine to encapsulate the data packet with the second destination address if the data packet is received from the first local router engine.

11. The method of claim 10 further including the step of passing the encapsulated data packet to a first remote router engine to determine a first hop through a tunnel of the carrier network leading to the second computer system.

12. The method of claim 11 further including the steps of:

passing the encapsulated data packet to a second remote router engine;

looking up a route to a second rule check engine; and passing the encapsulated data packet to the second rule check engine.

13. The method of claim 12 further including the step of extracting the data packet with the first destination address from the encapsulated data packet if the data packet is received from the second remote router engine.

14. The method of claim 13 further including the step of passing the data packet to the second computer system.

15. A communication system including a carrier network link between first and second computer systems, comprising:

a first local router engine coupled for receiving a data packet from the first computer system, where the data packet includes a first destination address compatible with the second computer system, and where the first local router engine determines if the data packet destined for the second computer system is to be routed through the carrier network link, and the first local router for receiving an unencapsulated data packet from the second computer system;

a first rule check engine coupled for receiving the data packet from the first local router engine, where the first rule check engine determines that the data packet has been received from the first local router engine, and in response, encapsulates the data packet with a second destination address compatible with the carrier network link if the data packet is to be routed through the carrier network link, and the first rule check engine for removing the encapsulation from an encapsulated data packet received from the second computer system via the carrier network and for removing the encapsulation to produce the unencapsulated data packet; and a first remote router engine coupled for receiving the encapsulated data packet and forwarding the encapsulated data packet to the carrier network link according to the second destination address.

16. The communication system of claim 15 further including a second remote router engine coupled for receiving the encapsulated data packet from the carrier network link and forwarding the encapsulated data packet based on a routing table entry for the second destination address.

17. The communication system of claim 16, further including a second rule check engine coupled for receiving the encapsulated data packet from the second remote router engine, where the second rule check engine extracts the data packet from the encapsulated data packet if the encapsulated data packet is received from the second remote router engine.

18. The communication system of claim 17, further including a second local router engine coupled for receiving the data packet from the second rule check engine and forwarding the data packet to the second computer system according to the first destination address.

* * * * *